Sept. 14, 1965     W. H. MEIKLEJOHN ETAL     3,206,385
DISPERSION HARDENING
Filed July 12, 1960
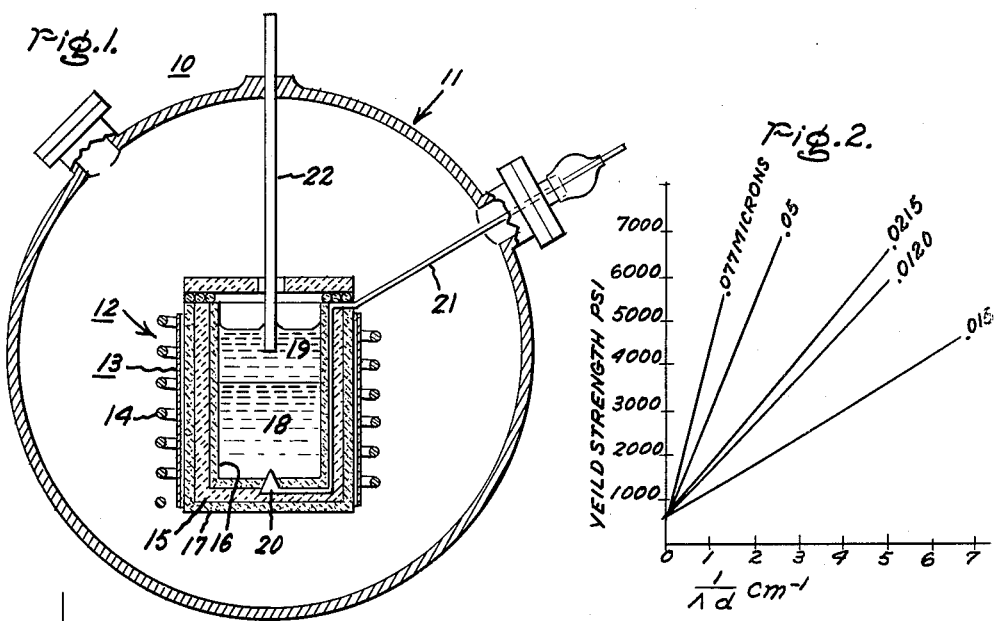
Inventors:
William H. Meiklejohn,
Raymond E. Skoda,
by James J. Lichiello
Their Attorney.

United States Patent Office 3,206,385
Patented Sept. 14, 1965

3,206,385
DISPERSION HARDENING
William H. Meiklejohn, Scotia, and Raymond E. Skoda, Schenectady, N.Y., assignors to General Electric Company, a corporation of New York
Filed July 12, 1960, Ser. No. 42,325
3 Claims. (Cl. 204—140)

This invention relates to dispersion hardening as a means for increasing the strength of metals and more particularly to electrodeposition means to provide added hard metallic particles in good electrical conducting metals to increase their operating strength without substantially detracting from their good electrical conducting properties.

Dispersion hardening is a means by which small particles of a given material are dispersed throughout a matrix of a metal in order to increase its strength. This is generally accomplished by powder metallurgy methods. Effective strengthening is obtained by slip interference within the grains of the matrix due to the presence of dispersed hard particles. One of the problems associated with such a method is that, it is extremely difficult to provide wetting of the particles, and if there is no wetting of the particles or the interface, the dispersed phase particle may be considered merely to be a loose particle in a hole, and the strength of such a material would be expected to be quite low for this reason. Furthermore, the dispersed phase should be dispersed in discrete form in order to prevent agglomeration at high temperatures or the metal is also weakened. In addition, only a small amount of precipitate is obtained which is insufficient for optimum strength increase and the material is prone to high temperature softening.

Another closely related method of providing small particles in a metal matrix is precipitation hardening. Precipitation hardening may be obtained by taking advantage of limited solubilities of, for example, iron in copper where the iron is dissolved in molten copper and the melt chill cast. However, when applied to, for example, metals of good electrical conducting properties, copper, silver, etc., where advantage is to be taken of conductivity, it has been discovered that precipitation hardening usually leaves considerable solvent material in the solute conducting matrix whereby the matrix has considerable reduced conductivity.

It has been discovered that dispersion hardening through an electrodeposition process provides a metal of increased strength without the inherent disadvantages of ordinary precipitation hardening and powder metallurgy processes, and further, that the electrodeposition process will provide high strength good electrically conductive materials from ordinarily low strength materials, such as copper or silver.

Accordingly, it is an object of this invention to provide an improved method of dispersion hardening.

It is another object of this invention to provide an improved dispersion hardened metal.

It is another object of this invention to provide dispersion of one metal in another which is substantially non-alloying therewith by means of electrodeposition.

It is yet another object of this invention to provide an improved electrical conductor by means of dispersion hardening.

Briefly described, this invention in one form includes electrodepositing one metal in another where the deposited metal is substantially non-alloying with respect to the receiver metal, in sufficient quantities, and of controlled particle size and dispersion, to increase the strength of the metal without, in one application, substantially subtracting from its conductivity characteristics.

FIG. 1 is an exemplary and schematic illustration of one electrodeposition apparatus.

FIG. 2 is a series of curves illustrating increase in yield strength of mercury (with electrodeposited iron) as a function of iron particle size and spacing.

FIG. 3 is a graphic representation illustrating comparative yield strength of copper and copper with electrodeposited molybdenum therein.

FIG. 4 is a series of curves illustrating resistivities of Oxygen Free Copper with molybdenum deposited therein, and O.F.C. with niobium, as compared to O.F.C. alone.

FIG. 5 is a curve illustrating resistivity of silver with iron deposited therein.

Referring now to FIG. 1, apparatus 10 is one suitable apparatus employed to provide an electrodeposition of one metal within another. In FIG. 1, an enclosure 11 is utilized to employ vacuum or inert atmosphere conditions about a furnace 12. Furnace 12 includes a crucible assembly 13 which is surrounded by electrical coils 14 for induction heating. Crucible assembly 13 comprises a crucible 15, for example, graphite with an inside liner 16 of, for example, alumina, and an outside liner 17 of, for example, recrystallized alumina. Within liner 16 is a molten metal 18, and an upper layer of a suitable metal salt 19. An electrode 20 is in contact with molten metal 18 and is connected to a suitable source of power (not shown) by conductor 21 connected externally of closure 11. Anode 22 is a rod of a metal, to be electrodeposited into metal 18, for example, iron, niobium, molybdenum, etc.

The apparatus as described in FIG. 1 has been employed to provide dispersion hardening of various metals $M_1$, such as for example, mercury, copper, silver, etc. These and other metals have increased strength, good electrical conductivity and other related advantages, in preferred form, when the dispersed phase metal $M_2$ is originally much harder than the matrix and substantially non-alloying therewith. As another example of this invention, a metal $M_1$ may be electrodeposited in a molten base metal $M_2$ and have fine particles of a compound of $M_1$ and $M_2$ formed which are insoluble in the base metal $M_2$. Another example according to the teachings of this invention consists of electrodepositing metal $M_1$ into a molten base metal $M_2$ which contains a dissolved metal $M_3$. The metal $M_1$ will form particles of a compound of $M_1$ and $M_3$ which will be insoluble in the base metal $M_2$. These fine particles will be a colloidal suspension in the base metal $M_2$.

An important feature of these metals, as dispersion hardened by the teachings of this invention, is that the strength of the metals will be much less dependent on temperature than ordinary precipitation hardened materials. This is also an important feature when considering electrical conductors. Most electrical power generating equipment must of necessity contain large amounts of copper in various elements or assemblies. These assemblies operate under conditions of stress which tax mechanical properties to their limits and, therefore, high strength copper of good electrical conductivity is a desirable material.

Specific examples of increased strength obtainable by dispersion hardening and according to the teachings of this invention are included as follows:

EXAMPLE 1

Iron particles were electrodeposited into mercury in uniform diameter in the range of 0.005 to 0.1 micron. The procedure consisted of placing about 80 cc. of pure mercury in a 60 milliliter beaker with a .35 molar ferrous amonium sulfate solution above the mercury. An iron anode was suspended in the electrolyte above the mercury and electrical contact was made to the mercury cathode. A current of 3 amperes (5.6 amperes/cm.$^2$) was passed through the solution while the mercury was being stirred. The plating time was varied to obtain the desired concentration. The amount of particles was determined by the amount of iron electrode deposited in the mercury. Iron particles obtained from this procedure are about 0.005 micron in diameter, uniformly dispersed in the mercury, and are ellipsoidal in shape with about a 1.5 to 1 axial ratio.

Particle diameters were determined by electron microscopy where the mercury containing the iron particles was placed in a "Mercury Oxifier" which permits oxygen to diffuse to the iron particles and oxidizes the surface of the particles. The particles, therefore, are no longer wet by the mercury and float to the surface to form a black powder. This powder is then collected and prepared in the usual manner for electron microscopy. Particle diameters were increased by placing a beaker of the iron mercury amalgam in an air oven for heat treatment.

The 80 cc. of mercury was then divided into eight portions of 10 cc. each. Different amounts of mercury were added to four of the portions to increase the spacing between particles to a predetermined value. The spacing between the particles in the remaining four portions was decreased by holding a beaker containing a 10 cc. portion in a 20,000-oersted magnetic field, and pouring off a predetermined amount of mercury. The magnetic field holds the iron particles while some of the mercury is free to be poured off. Because the iron particles wet the mercury, there is sufficient mercury that cannot be poured off. To further decrease the spacing between the particles, mercury was forced through a chamois cloth which holds the iron particles while permitting the mercury to pass.

Mercury from the various portions were chillcast at liquid nitrogen temperature and extruded to form .064 inch diameter wire tensile specimens of mercury containing iron particles. The increase in yield strength for the tensile specimens was found to be 12 times the ordinary yield strength for pure mercury tensile specimens. The yield strength of the mercury with respect to particle sizes, and distance between particles $$\frac{1 \text{ cm.}^{-1}}{(\wedge - d)}$$

is illustrated in FIG. 2. $\wedge$ is the spacing between centers of particles of diameter $d$. Maximum benefits were obtained with added iron up to about 8% with no substantial increase shown thereafter.

The following examples relate to dispersion hardening by electrodeposition not only to harden a given metal, but also to provide an improved electrical conductor, contact or the like item.

EXAMPLE 2

In the apparatus illustrated in FIG. 1, anode 22 is a ¼ inch diameter rod of molybdenum and molten metal 18 is copper at 1250° C. The fused salt 19 is a mixture of 73 percent barium fluoride and 27 percent magnesium fluoride. Typical values of voltage, current and ampere hours are 4 volts, 8 amperes, 12 ampere hours. High frequency heating was used to stir the molten copper so that the molybdenum particles would stay in suspension. Molybdenum particles are about 1–2 microns in diameter.

The system of molybdenum and copper indicates very low solubility of molybdenum. Therefore, little solution hardening took place and dispersion hardening could be well evaluated. In addition, molybdenum particles have a greater spacing than the mean free path of the conducting electrons, and therefore the conductivity is similar to O.F.C. copper (Oxygen Free Copper).

Yield strength of a 1.4 volume percent (±20 percent value) of molybdenum in copper alloy at raised temperatures is illustrated in FIG. 3 and is compared with that of pure copper. A .020 inch wire diameter specimen was annealed for about 3 hours at 200° C. before testing. In a 1.4 volume percent molybdenum copper annealed for 5 hours at 500° C., the yield strength was greatly increased over that of copper at all temperatures. This process is indicative of about a 12,000 p.s.i. increase yield strength at room temperature. Since molybdenum is practically insoluble in copper, both in the liquid and solid phases, the molybdenum and copper alloys maintain the yield strength at high temperature better than a precipitated material that redissolves in the matrix.

FIG. 4 illustrates resistivity of O.F.C. copper (Cu) as compared to dispersion hardened O.F.C. copper, i.e., with molybdenum electrodeposited therein. The hardened copper from which these results were obtained is that material prepared by Example 2. Insofar as electrical conductivity is concerned, the molybdenum particles which are of 1–2 microns diameter are spaced about 3–7 microns apart compared to the mean free path of the conducting electrons and, therefore, the resistivity of the copper is not greatly increased. Resistivity measurements indicate a slightly higher value of resistivity of the molybdenum and copper material, at lower temperatures, which is aparently due to impurities in the base copper.

Other strength tests indicated that the 1.4 volume percent molybdenum copper had about three times the 100 hour (450° C.) creep to rupture strength of O.F.C. or pure copper. Hardness tests showed the usual break at .55 $T_m$.

FIG. 4 also shows resistivity tests with niobium deposited in O.F.C. copper. The material for this test was taken from the table of examples on the following page and is to be compared with the curve given for O.F.C. copper. Some increase in resistivity is noted which is negligible in general conductor applications.

FIG. 5 is a curve illustrating resistivity of silver with iron electrodeposited therein. This material is also that indicated in the table of examples on the following page. The Fe-Ag material compares favorably with the resistivity of silver alone.

In all instances, the resistivity of the various metals with deposited metals therein follows a smooth curve much in the same manner as the pure material, i.e., O.F.C. copper, silver, etc., with no discontinuities or breaks. Accordingly, these materials find wide application in electrical conductor applications, and more particularly to those applications where high temperatures have deleteriously affected conductors strengthened by other means. This is also important where the conductors may be subjected to heat treatment, brazing, welding, etc., which injuriously affects other hardening means such as precipitation hardening.

With dispersion hardened copper as described in this invention, the mechanical strengthening and electrical conductivity are determined only by the volume fraction of the addition. More important, this strengthening is very stable and operating temperatures or fabrication steps, such as soldering, brazing, welding, etc., will not affect the inherent strength. Softening during processing constitutes a serious problem with, for example, copper. There are copper alloys, such as beryllium copper, etc., which can be dispersion hardened by normal precipitation means, but precipitation hardening generally leads to poor electrical conductivity because of residual solute in solution, and coherent precipitates which strain the solvent lattice. Moreover, such alloys lose their strength when brazed due to overaging. The simplicity of strengthening copper by the electrodeposition of metals, for example, molybdenum, iron, niobium, etc., and the strengthening of other materials by a suitable electrodepositing material of high strength and non-alloying characteristics, in accordance with the teachings of this invention presents a method of dispersion strengthening of these materials without the limitations imposed by ordinary strengthening processes or precipitation methods. The primary advantage of a copper, silver etc., electrical conductor in the form of, for example, a contact, is that it combines in one material a high melting point contact material with a high conductivity material. In such contacts or electrical conductors, any electrical arc should cause less evaporation of the dispersed particles, thereby increasing the life of the material.

The following table is a compilation of various additional examples of the electrodeposition process in accordance with the teachings of this invention utilizing the apparatus of FIG. 1:

While other modifications of this invention and variations of apparatus which may be employed within the scope of the invention have not been described, the invention is intended to include all such as may be embraced within the following claims.

What we claim as new and desire to secure by Letters Patent of the United States is:

1. A method of increasing the strength of a given metal which comprises reducing the metal to a molten state, making the molten metal the cathode of an electrolytic cell, passing a current between said cathode and an anode in said cell to electrolytically deposit a second metal in said first metal, said second metal being of a hardness greater than said first metal and essentially non-alloying therewith, agitating said first metal thereby maintaining the particles in suspension, and thereafter casting said melt.

2. The method as described in claim 1 wherein said given metal includes a metal taken from the class consisting of silver, copper and mercury.

3. The method as described in claim 1 wherein said second metal includes a metal taken from the class consisting of iron, molybdenum, tungsten and niobium.

*Table I*

| Cathode (Metal 18) | Anode Rod 22 | Salt 19 | Volume percent deposited | T.° C. | I, Amps | V, Volts | Amp. Hours |
|---|---|---|---|---|---|---|---|
| Cu | Nb | 73% $BaF_2$ / 27% $MgF_2$ | About 1 | 1,100 | 8 | 4 | 12 |
| Cu | W | 73% $BaF_2$ / 27% $MgF_2$ | About 1 | 1,200 | 8 | 4 | 12 |
| Ag | W | 73% $BaF_2$ / 27% $MgF_2$ | About 1 | 1,025 | 8 | 4 | 12 |
| Ag | Nb | 73% $BaF_2$ / 27% $MgF_2$ | About 1 | 1,125 | 8 | 4 | 12 |
| Ag | Fe | 73% $BaF_2$ / 27% $MgF_2$ | About .3 | 1,200 | 5 | 3 | 8 |

References Cited by the Examiner

UNITED STATES PATENTS

| | | | |
|---|---|---|---|
| 856,475 | 6/07 | Kugelgen | 204—71 |
| 1,563,187 | 11/25 | Harvey | 204—71 |
| 1,986,197 | 1/35 | Harshaw | 204—10 |
| 2,197,376 | 4/40 | Emmert et al. | 75—173 |
| 2,239,144 | 4/41 | Dean et al. | 75—169 |
| 2,367,811 | 1/45 | Urban | 204—130 |
| 2,409,295 | 10/46 | Marvin et al. | 204—10 |
| 2,410,717 | 11/46 | Cox | 75—173 |
| 2,546,548 | 3/51 | Koster | 204—293 |
| 2,974,104 | 3/61 | Paine et al. | 204—124 |
| 2,983,349 | 5/61 | Meiklejohn | 204—10 |
| 2,987,454 | 6/61 | Kopelman et al. | 204—64 |

OTHER REFERENCES

"Electroplating Engineering Handbook," by Graham, 1955, pages 16–22.

Hackh's Chemical Dictionary, by Grant, 3rd edition, 1944, pages 34–5.

The Electrochemical Society Transactions, volume 89, 1946, pages 373–382.

"Treatise on Powder Metallurgy," by Goetzel, volume III, 1952, page 63.

JOHN H. MACK, *Primary Examiner.*

JOHN R. SPECK, *Examiner.*